US005753138A

United States Patent [19]

Watson et al.

[11] Patent Number: 5,753,138

[45] Date of Patent: May 19, 1998

[54] BLEACHING DETERGENT COMPOSITIONS COMPRISING BLEACH ACTIVATORS EFFECTIVE AT LOW PERHYDROXYL CONCENTRATIONS

[75] Inventors: Randall Alan Watson; Kevin Lee Kott; Alan David Willey, all of Cincinnati; Gregory Scot Miracle, Forest Park; James Charles Theophile Roger Burckett-St. Laurent, Cincinnati, all of Ohio

[73] Assignee: The Procter & Gamble Company, Cincinnati, Ohio

[21] Appl. No.: 768,188

[22] Filed: Dec. 17, 1996

Related U.S. Application Data

[63] Continuation of Ser. No. 341,814, Nov. 18, 1994, abandoned, and a continuation-in-part of Ser. No. 82,207, Jun. 24, 1993, Pat. No. 5,405,413.

[51] Int. Cl.$^6$ .............................. C01B 11/00; C01B 7/00; C11D 3/02

[52] U.S. Cl. .............................. 252/186.1; 252/186.38; 252/186.2; 252/186.31; 252/186.39; 510/220; 510/276

[58] Field of Search .............................. 252/186.1, 186.38, 252/186.39, 186.2, 186.31; 510/220, 276

[56] References Cited

U.S. PATENT DOCUMENTS

| | | | |
|---|---|---|---|
| 3,042,621 | 7/1962 | Kirschenbauer | 252/99 |
| 3,075,921 | 1/1963 | Brocklehurst | 252/99 |
| 3,177,148 | 4/1965 | Bright | 252/99 |
| 3,637,339 | 1/1972 | Gray | 8/111 |
| 3,775,332 | 11/1973 | Heins | 252/95 |
| 3,812,247 | 5/1974 | Heins | 424/62 |
| 4,013,575 | 3/1977 | Castrantas | 252/104 |
| 4,448,705 | 5/1984 | Gray | 252/102 |
| 4,545,784 | 10/1985 | Sanderson | 8/107 |
| 4,664,837 | 5/1987 | Gray | 252/99 |
| 4,749,512 | 6/1988 | Broze et al. | 252/174.18 |
| 4,778,618 | 10/1988 | Fong | 252/186.23 |
| 4,790,952 | 12/1988 | Steichen | 252/186.39 |
| 4,800,035 | 1/1989 | Broze et al. | 252/99 |
| 4,820,437 | 4/1989 | Akabane et al. | 252/186.39 |
| 5,196,133 | 3/1993 | Leslie et al. | 252/186.26 |
| 5,405,412 | 4/1995 | Willey | 8/111 |
| 5,405,413 | 4/1995 | Willey | 8/111 |
| 5,419,847 | 5/1995 | Showell et al. | 252/100 |
| 5,445,756 | 8/1995 | Didier et al. | 252/104 |
| 5,460,747 | 10/1995 | Gosselink et al | 252/186.38 |
| 5,500,153 | 3/1996 | Figuero et al. | 252/174 |
| 5,552,556 | 9/1996 | Miracle et al. | 252/186.38 |
| 5,560,862 | 10/1996 | Gosselink et al. | 252/186.37 |
| 5,561,235 | 10/1996 | Gosselink et al. | 252/186.39 |
| 5,584,888 | 12/1996 | Miracle et al. | 8/11 |
| 5,635,104 | 6/1997 | Kott et al. | 252/186.1 |

FOREIGN PATENT DOCUMENTS

| | | | |
|---|---|---|---|
| 257700 | 3/1988 | European Pat. Off. | C11D 3/39 |
| 572724 | 12/1993 | European Pat. Off. | C11D 3/39 |
| 02115154 | 4/1990 | Japan | C07C 237/52 |
| WO 93/12067 | 6/1993 | WIPO | C07C 69/66 |
| WO 93/20167 | 10/1993 | WIPO | C09K 3/00 |
| WO 94/18298 | 8/1994 | WIPO | C11D 3/39 |
| WO 94/18299 | 8/1994 | WIPO | C11D 3/39 |

OTHER PUBLICATIONS

Aikawa CA 875:1086z, 1976

Stehlicek CA 108:187402w, 1988.

Ishida CA 88:169981y, 1978.

Kirk Othmer, Encyclopedia of Chemical Technology, vol. 7, 4th Ed., 1993, pp. 1072–1117.

Kirk Othmer, Encyclopedia of Chemical Technology, vol. 9, 4th Ed., 1993, pp. 567–620.

Kirk Othmer, Encyclopedia of Chemical Technology, vol. 4, 4th Ed., 1994, pp. 271–299.

*Primary Examiner*—Shean C. Wu

*Attorney, Agent, or Firm*—Brian M. Bolam; Kim William Zerby; Jacobus C. Rasser

[57] ABSTRACT

Bleaching detergent compositions comprising particular bleach activators are provided. Excellent bleaching is secured through the selection of bleach activators which operate successfully under mildly alkaline washing conditions or in the presence of reduced levels of hydrogen peroxide.

18 Claims, No Drawings

BLEACHING DETERGENT COMPOSITIONS COMPRISING BLEACH ACTIVATORS EFFECTIVE AT LOW PERHYDROXYL CONCENTRATIONS

RELATED APPLICATIONS

This is a continuation of application Ser. No. 08/341,814, filed on Nov. 18, 1994 now abandoned and a continuation-in-part of U.S. Ser. No. 08/082,207, filed Jun. 24, 1993, now U.S. Pat. No. 5,405,413 issuing Apr. 11, 1995.

FIELD OF THE INVENTION

The present invention relates to improved bleaching detergent compositions comprising bleach activators. The bleach activators improve bleaching by hydrogen peroxide sources such as perborate.

BACKGROUND OF THE INVENTION

The formulation of detergent compositions which effectively remove a wide variety of soils and stains from fabrics under wide-ranging usage conditions, for example in a range of Pacific rim countries, remains a considerable challenge to the laundry detergent industry. The problems associated with the formulation of truly effective cleaning and bleaching compositions have been exacerbated by legislation which limits the use of effective ingredients such as phosphate builders in many regions of the world.

Most conventional cleaning compositions contain mixtures of various detersive surfactants to remove a wide variety of soils and stains from surfaces. In addition, various detersive enzymes, soil suspending agents, non-phosphorus builders, optical brighteners, and the like may be added to boost overall cleaning performance. Many fully-formulated cleaning compositions contain oxygen bleach, which can be a perborate or percarbonate compound. While quite effective at high temperatures, perborates and percarbonates lose much of their bleaching function at the low to moderate temperatures increasingly favored in consumer product use for energy efficiency or other reasons, e.g., convenience of hand-washing. Accordingly, various bleach activators such as tetraacetylethylenediamine (TAED) and nonanoyloxybenzenesulfonate (NOBS) have been developed to potentiate the bleaching action of perborate and percarbonate across a wide temperature range. NOBS is particularly effective on "dingy" fabrics.

A limitation with activators such as the widely commercialized TAED is that the wash solution or liquor should have a pH of about 10 or higher for best results. Since soils, especially from foods, are often acidic, detergent products are frequently quite alkaline or are buffered sufficiently to maintain a high pH so the bleach activator system can operate effectively throughout the wash. However, this need runs counter to providing milder formulations which could be improved in their compatibility with fabrics, glassware and/or skin. In cleaning operations below pH 10, many of the existing bleach activators lose their effectiveness or undergo competeing side reactions which produce ineffective byproducts.

The search, therefore, continues for more effective activator materials, especially for use in mildly alkaline washing liquors or with decreased levels of perborate or other sources of hydrogen peroxide. Improved activator materials should be safe, designed to interact effectively with troublesome soils and stains, and will preferably be very efficient. Various activators have been described in the literature. Many are esoteric and expensive and thus difficult to commercialize, especially in certain countries, as in parts of Asia, where local sources of raw materials may not be available.

It has now been determined that certain selected bleach activators are unexpectedly effective in removing soils and stains from fabrics and hard surfaces such as dishes even under low alkaline wash conditions or with decreased levels of hydrogen peroxide. These activators also have advantageously high ratios of rates of perhydrolysis to hydrolysis and of perhydrolysis to diacylperoxide formation. Without being limited by theory, these unusual rate ratios lead to a number of significant benefits for the instant activators, including increased efficiency, avoidance of wasteful byproduct formation in the wash, increased color compatibility, increased enzyme compatibility, and better stability on storage.

When formulated as described herein, bleaching detergent compositions are provided using the selected bleach activators to remove soils and stains under a variety of conditions, including high-soil conditions, with excellent results. The activators are designed or selected to function well over a wide range of washing or soaking temperatures. In short, bleaching detergent compositions herein provide a substantial advance over those known in the art, as will be seen from the disclosures hereinafter.

BACKGROUND ART

Bleach activators of various types are described in U.S. Pat. Nos. 4,545,784; 4,013,575; 3,075,921; 3,637,339; 3,177,148; 3,042,621; 3,812,247; 3,775,332; 4,778,618; 4,790,952; EP 257,700; WO 94/18,299; WO 94/18,298; WO 93/20,167; WO 93/12,067; and in JP 02115154. Other references include Aikawa CA 85:1086z; Stehlicek CA 108:187402w; Ishida CA 88:169981y; Kirk Othmer, Encyclopedia of Chemical Technology, Vol. 7, 4th Ed., 1993, pp. 1072–1117; Kirk Othmer, Encyclopedia of Chemical Technology, Vol. 4, 4th Ed., 1994, pp. 271–299; Kirk Othmer, Encyclopedia of Chemical Technology, Vol. 9, 4th Ed., 1993, pp. 567–620.

SUMMARY OF THE INVENTION

The present invention provides a bleaching detergent composition having low soil level resistivity comprising (a) from about 0.1% to about 20%, preferably from about 0.2% to about 10%, more preferably from about 0.4% to about 4% of a bleach activator having a perhydrolysis selectivity coefficient, $Kp/K_D$, of at least about 5, preferably at least about 20, more preferably at least about 50, and a low-pH perhydrolysis-efficiency coefficient of at least about 0.15, preferably at least about 0.30, most preferably at least about 0.5; and (b) from about 0.2% to about 40%, preferably from about 0.5% to about 35%, more preferably from about 1% to about 25%, of a hydrogen peroxide source; the quantities of (b) being expressed on a weight basis counting the entire hydrogen peroxide source as distinct from a molar or "available oxygen" basis which may be used from time to time, as indicated, elsewhere herein. The terms "soil level resistivity", "perhydrolysis selectivity coefficient" and "low pH perhydrolysis efficiency coefficient" are defined in detail hereinafter.

Preferred bleach activators for component (a) include, but are not limited to any of the following: p-nitrobenzoyl caprolactam; p-nitrobenzoylvalerolactam; linear or branched $C_2$–$C_9$ alkylsulfonylbenzoylcaprolactam; linear or branched $C_2$–$C_9$ alkylsulfonylbenzoylvalerolactam; linear or branched $C_2$–$C_9$ alkyloxysulfonylbenzoylcaprolactam;

linear or branched $C_2$–$C_9$ alkyloxysulfonylbenzoylvalerolactam; linear or branched $C_2$–$C_9$ alkyl(amino) sulfonylbenzoylcaprolactam; linear or branched $C_2$–$C_9$ alkyl (amino)sulfonylbenzoylvalerolactam; 2-fliroylcaprolactam; 2-furoylvalerolactam; 3-furoylcaprolactam; 3-furoylvalerolactam; 5-nitro-2-furoylcaprolactam; 5-nitro-2-furoylvalerolactam; 1-naphthylcaprolactam; 1-naphthylvalerolactam; and mixtures thereof. More preferably in these embodiments, the performance-enhanced bleach activator is selected from the group consisting of linear or branched $C_2$–$C_9$ alkylsulfonylbenzoylcaprolactam; linear or branched $C_2$–$C_9$ alkylsulfonylbenzoylvalerolactam; linear or branched $C_2$–$C_9$ alkyloxysulfonylbenzoylcaprolactam; linear or branched $C_2$–$C_9$ alkyloxysulfonylbenzoylvalerolactam; linear or branched $C_2$–$C_9$ alkyl (amino)-sulfonylbenzoylcaprolactam; linear or branched $C_2$–$C_9$ alkyl(amino)sulfonylbenzoyl-valerolactam; 2-furoylcaprolactam; 2-furoylvalerolactam; 3-furoylcaprolactam; 3-furoylvalerolactam; 5-nitro-2-furoylcaprolactam; 5-nitro-2-furoylvalerolactam; and mixtures thereof.

In preferred embodiments, bleaching detergent compositions are provided wherein said components (b) and (a) are at a ratio of from about 3:1 to about 20:1, as expressed on a basis of (b):(a) in units of moles $H_2O_2$ delivered by said hydrogen peroxide source to moles bleach activator.

Compositions of the invention may further comprise (c) from about 0.1% to about 50% of pH-reducing nonsoap detersive ingredients; such ingredients are a particularly convenient solution to the problem of offsetting the upward-buffering tendencies of common hydrogen peroxide sources such as sodium perborate salts. Such offsetting may be desirable in certain embodiments, e.g., for mild, skin-compatible compositions.

In certain preferred embodiments, there may be added from about 0.01% to about 5% of a soil release polymer, for its fabric-care advantages.

In a highly preferred embodiment, suitable pH-reducing nonsoap detersive ingredients herein consist essentially of from about 1% to about 25% of one or more members selected from the group consisting of:

(i) nonsoap ionic detersive surfactants;

(ii) polymeric dispersants;

(iii) transition-metal chelants; and (iv) mixtures thereof

To further illustrate, said pH-reducing nonsoap detersive ingredient may be an ionic detersive surfactant selected from the group consisting of anionic detersive surfactants in at least partially acidic form; semipolar surfactants; zwitterionic surfactants; and mixtures thereof.

The advantage of the above component is to combine in a single material the cleaning functionality of a surfactant with the ability to "tune" the formulation so that it delivers a specific pH range. To be clear, without the selected bleach activators used herein, such tuning would negatively affect bleaching performance.

Surfactants which are normally neutral may also be added for their usual cleaning function, though it is self-evident that such surfactants do not have built-in pH lowering effects. A preferred surfactant which may also be added to the composition but which does not markedly alter pH is a sugar-derived detersive surfactant such as an alkyl N-methylglucosamide. Ethoxylated nonionic detersive surfactants are likewise "neutral" for the purposes of the present invention.

Preferred embodiments of the bleaching detergent compositions herein have solid form. Preferred compositions include granules. For storage reasons, especially in hot countries such as Saudi Arabia, it is preferred that the selected bleach activator has a melting-point of about 30° C. or higher, preferably, 50° C. or higher.

The instant bleaching detergent compositions may further comprise an alkaline detergent builder, such as a phosphate salt, preferably at a level not in excess of about 35%.

In other highly preferred embodiments of the bleaching detergent composition, the alkaline hydrogen peroxide source is a sodium perborate such as sodium perborate monohydrate or sodium perborate tetrahydrate, and the pH-reducing system of compatible nonsoap detersive ingredients is present at a level of from about 1% to about 12%.

Highly desirable, as noted, is the further inclusion of a soil release polymer. When present, the soil release polymer is preferably a member selected from the group consisting of nonionic soil release polymers; sulfo-end-capped soil release polymers; and mixtures thereof. Such polymers are defined and illustrated in more detail hereinafter using the equivalent terms "polymeric soil release agent" or "soil release agent".

In a further non-limiting illustration, the invention provides a solid-form detergent composition delivering an in-use pH in the range from about 7 to about 9.5, comprising: from about 0.4% to about 4% of a bleach activator having a perhydrolysis selectivity coefficient of 5 or greater and a low-pH perhydrolysis-efficiency coefficient of 0.3 or higher; and, as formulated, from about 1% to about 12% of an at least partially acidic nonsoap detersive surfactant. Such a composition may further comprise from about 0.1 to about 10% of a member selected from the group consisting of sodium phosphate builder salts, sodium polycarboxylate builder salts, and mixture thereof; and about 10% or greater of a member selected from the group consisting of sodium chloride, sodium sulfate and mixtures thereof; optionally, the composition may further include a conventional alkanoyloxybenzenesulfonate bleach activator or a conventional tetraacetylethylenediamine bleach activator.

Bleaching detergent compositions of this invention may include additional detergent additives including one or more of the following ingredients: anti-redeposition or anti-encrustation polymers, transition-metal chelants, builders, flourescent whitening agents, dye transfer inhibitors, perfumes, colorants and fillers. Compositions of this invention are typically formulated below drycleaning-useful levels of any organic solvent. Preferably the compositions are substantially free from organic solvents. Suitable builders are selected from the group consisting of phosphate builders including but not limited to sodium tripolyphosphate, tetrasodium pyrophosphate, disodium diacid pyrophosphate, citrate, layered silicate, zeolite A, zeolite P in its various modifications, and mixtures thereof.

In preferred embodiments, the bleaching compositions deliver an aqueous pH in the range from about 6.5 to about 9.5, more preferably from about 7 to about 9, still more preferably from about 7.5 to about 8.5, and the level of source of hydrogen peroxide is sufficient to provide a perhydroxyl ion concentration, as measured at a pH of about 7.5, of about $10^{-4}$ to about $10^{-10}$ molar, more preferably about $10^{-5}$ to about $10^{-8}$ molar.

The present invention has numerous advantages, including, but not limited to, improved bleaching in lower pH, skin-compatible handwash formulations for laundering fabrics, which can have granule or laundry bar form.

By "effective amount" herein is meant an amount which is sufficient, under whatever comparative test conditions are employed, to enhance cleaning of a soiled surface. Likewise, the term "catalytically effective amount" refers to an amount which is sufficient under whatever comparative test conditions are employed, to enhance cleaning of a soiled surface.

All percentages, ratios and proportions herein are by weight, unless otherwise specified. All documents cited are, in relevant part, incorporated herein by reference.

DETAILED DESCRIPTION OF THE INVENTION

Soil Level Resistivity—It is well known by those skilled in the art that many soils typically encountered in detergent applications are effectively acidic in nature. As such, the type and amount of soil encountered may significantly lower the in-use pH of a detergent formulation. Common body soils, for example, can include sebacious fatty acids, citric acid, lactic acid and the like as well as triglyceride esters which can hydrolyze in an alkaline aqueous environment to produce additional carboxylic acid species. The response of a detergent formulation to the introduction of acidic components can be gauged by measuring the change in pH of a standard solution of the formulation upon addition of a model acid, acetic acid.

The "Soil Level Resistivity" (SLR) of a product is determined as follows: A 3500 ppm product standard solution is prepared by dissolving 3.50 g of product in distilled, deionized water (at 25° C.) to a total weight of 1 kg. The solution is stirred for 30 minutes and the pH measured immediately thereafter. The measured pH is defined as $pH_i$. After determining $pH_i$, 30 ml of an acetic acid solution (prepared by diluting 1 ml of glacial acetic acid with distilled, deionized water to a total volume of 1000 ml) is added to said product standard solution and the resulting mixture is stirred for 5 minutes, after which a second pH ($pH_f$) is measured.

The soil level resistivity, denoted as σ, is defined by the equation $$\sigma=10\times(\theta/\Gamma):$$

where $$\Gamma\times pH_i-pH_f,$$

$$\theta=\delta^2/pH_i,$$

and wherein, when $pH_i \geqq pH_c$, $$\delta=pH_i-pH_c,$$

and when $pH_i<pH_c$, $\delta=0$. Said $pH_c$ is the critical pH, given by $$pH_c=pK_{a_{peracid}}+\Delta pK_c$$

where $\Delta pK_c$ is the critical ΔpK given by $$\Delta pK_c = 100[(1/pK_{a_{peracid}})-(1/pH_{pref})]$$

wherein $pK_{a_{peracid}}$ is the aqueous $pK_a$ of the peracid species present in the standard solution, and $pH_{pref}$ is the preferred pH, set equal to the midpoint of the most preferred in-use wash pH range of 7.5–8.5. When two or more peracid species are present, the lowest $pK_{a_{peracid}}$ value is used to calculate δ.

The soil level resistivity of any particular detergent formulation can be designated based on its σ value as shown in the table below.

| SLR Designation | σ Value |
|---|---|
| high | $\sigma > 25$ |
| moderate | $10 < \sigma \leqq 25$ |
| low | $\sigma \leqq 10$ |

Performance Enhanced Bleach Activator Component—Bleaching detergent compositions of the present invention comprise a particular bleach activator component. The essential activator is selected to have particular properties so as to be more effective in promoting bleaching under certain use conditions in which TAED or similar conventional bleach activators are relatively inefficient and ineffective.

A preferred group of essential activators comprises compounds having one or more moieties RC(O)— which produce a peracid RC(O)—OOH on perhydrolysis (reaction with perhydroxyl, $^-OOH$). R is selected such that the difference in aqueous $pK_a$ between acetic acid and the carboxylic acid analog, RC(O)OH, of said peracid is at least 0.6, preferably at least about 1.2. When it is stated that the difference in aqueous $pK_a$ between acetic acid and the carboxylic acid analog, RC(O)OH, of a peracid is at least 0.6, the following subtraction, in the indicated order, is made: $pK_a$ ($CH_3C(O)OH$)—$pK_a$ (RC(O)OH).

These performance-enhanced bleach activators also have a low pH perhydrolysis efficiency coefficient (a practical measure of peracid formation further defined hereinafter) of greater than about 0.15, preferably greater than about 0.3, and a ratio $kp/k_D \geqq 5$, more preferably $kp/k_D \geqq 30$, still more preferably $kp/k_D \geqq 50$, wherein kp is the rate constant for perhydrolysis of the performance-enhanced bleach activator and $k_D$ is the rate constant for the formation of a diacylperoxide, RC(O)OOC(O)R, from the performance-enhanced bleach activator.

The activators herein preferably comprise one or more moieties, L, which act as leaving groups on perhydrolysis. Thus, preferred performance enhanced bleach activators herein have the formula RC(O)—L.

Preferred leaving groups, L, comprise at least one tri-coordinate nitrogen atom covalently connecting L to RC(O) —. Furthermore, the preferred performance-enhanced bleach activators are capable of forming a maximum of one mole equivalent of said peracid on perhydrolysis and have $k_H \leqq 10\ M^{-1}\ s^{-1}$ and a ratio $kp/k_H \geqq 1$, more preferably $kp/k_H \geqq 2$, wherein $k_H$ is the rate constant for hydrolysis of the performance-enhanced bleach activator and kp is said rate constant for perhydrolysis.

In general, R and L can independently be neutral or can be charged either positively or negatively. In preferred compositions, both R and L are neutral wherein L is typically selected from suitably substituted or unsubstituted lactams, 2-alkyl 4,5- dihydroimidazoles, and mixtures thereof, and R is illustrated by p-nitrophenyl or, more preferably, an alkylsulfonylphenyl moiety. Suitable R moieties are illustrated at length hereinafter.

In preferred embodiments, R can be connected to —C(O)— through a carbon atom which forms part of an aromatic ring, and L can be selected such that its conjugate acid, HL, has an aqueous $pK_a$ in the range from greater than about 13 to less than about 17.

In other highly preferred embodiments, the performance-enhanced bleach activator as a whole, or simply its leaving group, L, is free from any heterocyclic moiety wherein a hydrogen atom is attached to a carbon atom that is alpha to both a carbonyl group and a multivalent heteroatom.

In highly preferred embodiments, these compositions further comprise a bleach catalyst at the art-disclosed levels.

Such compositions have particularly significant bleaching performance enhancement as compared with otherwise identical compositions in which a conventional bleach activator such as TAED is used in place of the performance-enhanced bleach activator.

This invention also includes bleaching detergent compositions comprising novel, performance-enhanced bleach activator compounds having the formula RC(O)—L, wherein L is selected from the group consisting of lactams and 4,5-dihydroimidazoles; R is selected from the group consisting of substituted phenyl having more than one chloro, bromo or nitro substituent; furan or substituted furan having one or more chloro, bromo, nitro, alkylsulfonyl or arylalkylsulfonyl substituents; 1-naphthyl; substituted 1-naphthyl; or substituted 2-naphthyl having one or more chloro, bromo or nitro substituents;

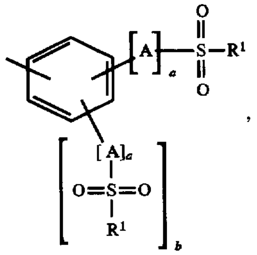

,

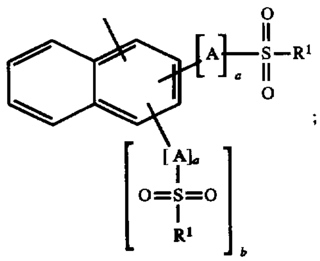

;

and mixtures thereof;

wherein in each structure a is independently 0 or 1, b is 0 or 1, and A is selected from O and $NR^2$ wherein $R^2$ is H or methyl; and wherein when a is 1 and A is 0, $R^1$ is selected from alkyl, arylalkyl, alkoxy, aryloxy, alkylamino, and arylamino; when a is 1 and A is other than O, $R^1$ is selected from alkyl and arylalkyl. Compositions comprising these novel compounds are also included in the scope of this invention.

Moieties RC(O)—In preferred bleach activators useful herein, R is nonlimitingly illustrated by electronegatively substituted phenyl selected from the group consisting of p-chlorophenyl, m-chlorophenyl, p-nitrophenyl, 3,5-dichlorophenyl, and 3,5-dinitrophenyl, and mixtures thereof. In yet other preferred embodiments, R is selected from alkylsulfonylphenyl, arylalkylsulfonylphenyl, alkylsulfonyl naphthyl, arylalkylsulfonyl-naphthyl, and mixtures thereof. Note that when naphthyl is selected, unsubstituted 1-naphthyl or substituted 1- or 2-naphthyl is preferred. Other examples of preferred bleach activators include those wherein R is a substituted or unsubstituted furan, and wherein R is substantially free from chloro- or nitro- substituents.

Leaving Groups—The L moieties in the performance-enhanced bleach activators useful in this invention are preferably selected from the group consisting of unsubstituted lactams, substituted lactams, substituted or unsubstituted 2-alkyl 4,5-dihydroimidazoles, and mixtures thereof. Particularly preferred examples of L are those selected from the group consisting of:

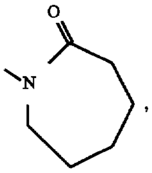

,

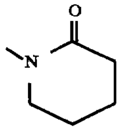

and

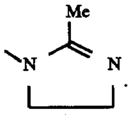

.

Novel Performance-Enhanced Bleach Activator Compounds—In preferred novel bleach activator compounds of this invention, L is as indicated supra and R is selected from the group consisting of:

(I):

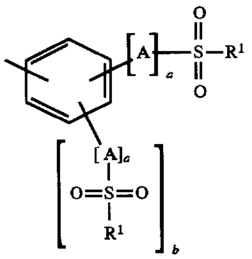

wherein a is independently 0 or 1, b is 0 or 1, A is selected from O and $NR^2$ wherein $R^2$ is H or methyl; when a is 0 or when a is 1 and A is O, $R^1$ is selected from alkyl, arylalkyl, alkoxy, aryloxy, alkylamino, and arylamino; when a is 1 and A is other than O, $R^1$ is selected from alkyl and arylalkyl; and (II) furan or substituted furan, having the formula:

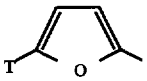

or

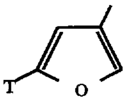

wherein T is selected from the group consisting of H, $NO_2$, Br, alkyl, and arylalkyl.

In a highly preferred embodiment of the performance boosting bleach activator, L is preferably selected from the group consisting of:

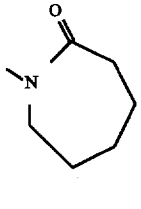

or

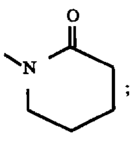

;

and R is selected from the group consisting of:

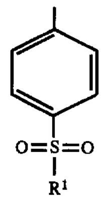 , 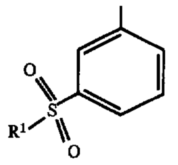 ,

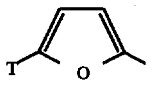 or 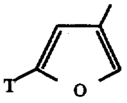

wherein R1 is selected from alkyl, arylalkyl, alkoxy, aryloxy, alkylamino, and aryl-amino; and T is selected from the group consisting of H, Br, and $NO_2$. Compositions comprising these novel compounds are also included in the scope of this invention.

$pK_a$ Rate and Perhydrolysis Criticalities—In accordance with the present invention, there are provided bleaching compositions wherein the bleach activators are required to respect criticalities of $pK_a$ and criticalities relating to rates of perhydrolysis, hydrolysis and diacylperoxide formation. Furthermore, perhydrolysis effciency is important in selecting the bleach activator. All of these criticalities will be better understood and appreciated in light of the following disclosure.

$pK_a$ Value—The acids in which organic chemists have traditionally been interested span a range, from the weakest acids to the strongest, of about 60 pK units. Because no single solvent is suitable over such a wide range, establishment of comprehensive scales of acidity necessitates the use of several different solvents. Ideally, one might hope to construct a universal acidity scale by relating results obtained in different solvent systems to each other. Primarily because solute-solvent interactions affect acid-base equilibria diffently in different solvents, it has not proven possible to establish such a scale.

Water is taken as the standard solvent for establishing an acidity scale. It is convenient, has a high dielectric constant, and is effective at solvating ions. Equilibrium acidities of a host of compounds (e.g., carboxylic acids and phenols) have been determined in water. Compilations of pK data may be found in Perrin, D. D. "Dissociation Constants of Organic Bases in Aqueous Solution"; Butterworths: London, 1965 and Supplement, 1973; Serjeant, E. P.; Dempsey, B. "Ionisation Constants of Organic Acids in Aqueous Solution"; 2nd ed., Pergammon Press: Oxford, 1979. Experimental methods for determining $pK_a$ values are described in the original papers. The $pK_a$ values that fall between 2 and 10 can be used with a great deal of confidence; however, the further removed values are from this range, the greater the degree of skepticism with which they must be viewed.

For acids too strong to be investigated in water solution, more acidic media such as acetic acid or mixtures of water with perchloric or sulfuric acid are commonly employed; for acids too weak to be examined in water, solvents such as liquid ammonia, cyclohexylamine and dimethylsulfoxide have been used. The Hammett $H_o$ acidity function has allowed the aqueous acidity scale, which has a practical $pK_a$ range of about 0–12, to be extended into the region of negative $pK_a$ values by about the same range. The use of H_acidity functions that employ strong bases and cosolvents has similarly extended the range upward by about 12 $pK_a$ units.

The present invention involves the use of leaving groups the conjugate acids of which are considered to be weak; they possess aqueous $pK_a$ values greater than about 13. To establish only that a given compound has an aqueous $pK_a$ above about 13 is straightforward. As noted above, values much above this are difficult to measure with confidence without resorting to the use of an acidity function. The measurement of the acidity of weak acids using the H_method, which has the advantage of an aqueous standard state, is suitable for determining if the conjugate acid, HL, of leaving group, L, has an aqueous $pK_a$ of greater than about 13 to less than about 17. Hovever, it is restricted in that (1) it requires extrapolation across varying solvent media and (2) errors made in determining indicator $pK_a$ values are cumulative. For these and other reasons, Bordwell and co-workers have developed a scale of acidity in dimethylsulfoxide (DMSO). This solvent has the advantage of a relatively high dielectric constant ($\epsilon$=47); ions are therefore dissociated so that problems of differential ion pairing are reduced. Although the results are referred to a standard state in DMSO instead of in water, a link with the aqueous $pK_a$ scale has been made. When acidities measured in water or on a water-based scale are compared with those measured in DMSO, acids whose conjugate bases have their charge localized are stronger acids in water; acids whose conjugate bases have their charge delocalized over a large area are usually of comparable strength. Bordwell details his findings in a 1988 article (*Acc. Chem. Res.* 1988, 21, 456–463). Procedures for measurement of $pK_a$ in DMSO are found in papers referenced therein.

Definitions of $k_H$, $k_p$, and $k_D$—In the expressions given below, the choice of whether to use the concentration of a nucleophile or of its anion in the rate equation was made as a matter of convenience. One skilled in the art will realize that measurement of solution pH provides a convenient means of directly measuring the concentration of hydroxide ions present. One skilled in the art will further recognize that use of the total concentrations of hydrogen peroxide and peracid provide the most convenient means to determine the rate constants $k_p$ and $k_D$.

The terms, such as RC(O)L, used in the following definitions and in the conditions for the determination of $k_H$, $k_p$ and $k_D$, are illustrative of a general bleach activator structure and are not limiting to any specific bleach activator structure herein.

Definition of $k_H$ $$RC(O)L+HO^- \rightarrow RC(O)O^-+HL$$

The rate of the reaction shown above is given by $$Rate=k_H[RC(O)L][HO^-]$$

The rate constant for hydrolysis of bleach activator ($k_H$) is the second order rate constant for the bimolecular reaction between bleach activator and hydroxide anion as determined under the conditions specified below.

Definition of $k_p$ $$RC(O)L+H_2O_2 \rightarrow RC(O)O_2H+HL$$

The rate of the reaction shown above is given by $$Rate=k_p[RC(O)L][H_2O_2]_T$$

where $[H_2O_2]_T$ represents the total concentration of hydrogen peroxide and is equal to $[H_2O_2]+[HO_2^-]$.

The rate constant for perhydrolysis of bleach activator ($k_p$) is the second order rate constant for the bimolecular reaction between bleach activator and hydrogen peroxide as determined under the conditions specified below.

Definition of $K_D$ $$RC(O)L+RC(O)O_2H \rightarrow RC(O)O_2C(O)R+HL$$

The rate of the reaction shown above is given by $$Rate=k_D[RC(O)L][RC(O)O_2H]_T$$

where $[RC(O)O_2H]_T$ represents the total concentration of peracid and is equal to $$[RC(O)O_2H]+[RC(O)O_2^-].$$

The rate constant for the formation of a diacylperoxide from the bleach activator ($k_D$), the second order rate constant for the bimolecular reaction between bleach activator and peracid anion, is calculated from the above defined $k_{D'}$. The value for $k_{D'}$ is determined under the conditions specified below.

Definition of Perhydrolysis Selectivity Coefficient—Perhydrolysis selectivity coefficient is defined as the ratio $K_p/K_D$ wherein $K_p$ and $K_D$ are as defined as above.

Conditions for the Determination of Rate Constants

Hydrolysis—A set of experiments is completed to measure the rate of hydrolysis of a bleach activator RC(O)L in aqueous solution at total ionic strength of 1M as adjusted by addition of NaCl. The temperature is maintained at 35.0°±0.1° C. and the solution is buffered with $NaHCO_3$+$Na_2CO_3$. A solution of the activator ([RC(O)L] =0.5 mM) is reacted with varying concentrations of NaOH under stopped-flow conditions and the rate of reaction is monitored optically. Reactions are run under pseudo first-order conditions to determine the bimolecular rate constant for hydrolysis of bleach activator ($k_H$). Each kinetic run is repeated at least five times with about eight different concentrations of hydroxide anions. All kinetic traces give satisfactory fits to a first-order kinetic rate law and a plot of the observed first-order rate constant versus concentration of hydroxide anion is linear over the region investigated. The slope of this line is the derived second order rate constant $k_H$.

Perhydrolysis—A set of experiments is completed to measure the rate of perhydrolysis of a bleach activator RC(O)L in aqueous solution at pH=10.0 with constant ionic strength of 1M as adjusted by addition of NaCl. The temperature is maintained at 35.0°±0.1° C. and the solution is buffered with $NaHCO_3$+$Na_2CO_3$. A solution of the activator ([RC(O)L]=0.5 mM) is reacted with varying concentrations of sodium perborate under stopped-flow conditions and the rate of reaction is monitored optically. Reactions are run under pseudo first-order conditions in order to determine the bimolecular rate constant for perhydrolysis of bleach activator (kp). Each kinetic run is repeated at least five times with about eight different concentrations of sodium perborate. All kinetic traces give satisfactory fits to a first-order kinetic rate law and a plot of the observed first-order rate constant versus total concentration of hydrogen peroxide is linear over the region investigated. The slope of this line is the derived second order rate constant kp. One skilled in the art recognizes that this rate constant is distinct from, but related to, the second order rate constant for the reaction of a bleach activator with the anion of hydrogen peroxide ($k_{nuc}$). The relationship of these rate constants is given by the following equation:

$$k_{nuc}=kp\{(K_a+[H^+])/K_a\}$$

where $K_a$ is the acid dissociation constant for hydrogen peroxide.

Formation of diacylperoxide—A set of experiments is completed to measure the rate of formation of a diacylperoxide $RC(O)O_2C(O)R$ from a bleach activator RC(O)L in aqueous solution at pH=10.0 with constant ionic strength of 1M as adjusted by addition of NaCl. The temperature is maintained at 35.0°±0.1° C. and the solution is buffered with $NaHCO_3$+$Na_2CO_3$. A solution of the activator ([RC(O)L]=0.5 mM is reacted with varying concentrations of peracid under stopped-flow conditions and the rate of reaction is monitored optically. Reactions are run under pseudo first-order conditions in order to determine the bimolecular rate constant $k_{D'}$. Each kinetic run is repeated at least five times with about eight different concentrations of peracid anion. All kinetic traces give satisfactory fits to a first-order kinetic rate law and a plot of the observed first-order rate constant versus total concentration of peracid is linear over the region investigated. The slope of this line is the derived second order rate constant $k_{D'}$. The bimolecular rate constant for the formation of a diacylperoxide from peracid anion ($k_D$) is calculated according to $$k_D=k_{D'}\{(K_a+[H^+])/K_a\}$$

where $K_a$ is the acid dissociation constant for the peracid $RC(O)O_2H$. One skilled in the art will realize that the $pK_a$ values for peracids fall into a rather narrow range from about 7 to about 8.5 and that at pH=10.0, when $K_a \geqq$ about $10^{-8}$, $\{(K_a+[H^+])/K_a\} \cong 1$ and $k_D \cong k_{D'}$.

Test for Low pH Perhydrolysis Efficiency—This method is applicable as a test for screening any bleach activators RC(O)L (not intending to be limiting of any specific performance-enhanced bleach activator structure herein) by confirmation of the formation of peracid analyte $RC(O)O_2H$. The minimum standard for low pH perhydrolysis efficiency (LPE) is a coefficient, as defined below, ≧0.15 within 10 minutes when tested under the conditions specified below.

Test Protocol—Distilled, deionized water (495 mL; adjusted to pH 7.5 with NaH2PO$_4$ and $Na_2HPO_4$) is added to a 1000 mL beaker and heated to 40°±1° C. Three hundred seventy-five (375) mg of 30% concentration hydrogen peroxide is added to the beaker and the mixture is stirred for two minutes before a 5 mL solution containing 100 mg of activator (predissolved in 5 mL of an organic solvent (e.g. methanol or dimethylformamide)) is added. The initial data point is taken 1 minute thereafter. A second sample is removed at 10 minutes. Sample aliquots (2 mL) are examined via analytical HPLC for the quantitative determination of peracid $RC(O)O_2H$.

Sample aliquots are individually mixed with 2 mL of a pre-chilled 5° C. solution of acetonitrile/acetic acid (86/14) and placed in temperature controlled 5° C. autosampler for subsequent injection onto the HPLC column.

High performance liquid chromatography of the authentic peracid under a given set of conditions establishes the characteristic retention time ($t_R$) for the analyte. Conditions for the chromatography will vary depending on the peracid of interest and should be chosen so as to allow baseline separation of the peracid from other analytes. A standard calibration curve (peak area vs. concentration) is constructed using the peracid of interest. The analyte peak area of the 10 minute sample from the above described test is thereby converted to ppm peracid generated for determination of the quantity LPE. A bleach activator is considered acceptable when a value of the low pH perhydrolysis efficiency coefficient, LPE=[(ppm of peracid generated)/(theoretical ppm peracid)]≧0.15 is achieved within ten minutes under the specified test conditions.

To note, by comparison with 4,5-saturated cyclic amidine embodiments of the instant bleach activators, known closely related chemical compounds wherein the 4,5 position is unsaturated have surprisingly greater rates of hydrolysis. Specifically, acetyl imidazole has $k_H$ greater than $10.0M^{-1}s^{-1}$: accordingly this invention does not encompass imidazole as a leaving group.

Source of hydrogen peroxide—A source of hydrogen peroxide herein is any convenient compound or mixture which under consumer use conditions provides an effective amount of hydrogen peroxide. Levels in general may vary widely and are typically from about 0.5% to about 70%, more typically from about 0.5%. to about 25%, by weight of the bleaching compositions herein.

The source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Mixtures of any convenient hydrogen peroxide sources can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka.

Detersive Surfactants—Surfactants are usefull herein for their usual cleaning power and are generally used at the usual detergent-useful levels.

Nonlimiting examples of surfactants useful herein fall into two classes: those which can act as a pH-reducing nonsoap detersive ingredient, and those which can not. In the former of these two classes are the conventional $C_{11}$–$C_{18}$ alkylbenzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3—M^+)CH_3$ and $CH_3(CH_2)_y(CHOSO_3—M^+)CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), and $C_{12}$–$C_{18}$ alpha-sulfonated fatty acid esters. If desired, the conventional amphoteric surfactants such as the $C_{12}$–$C_{18}$ betaines and sulfobetaines ("sultaines"), $C_{10}$–$C_{18}$ amine oxides, and the like, can also be included in the overall compositions.

Optional surfactants, i.e., those in the second of the above-identified classes, which cannot normally serve for pH reduction herein, include the $C_{10}$–$C_{18}$ glycerol ethers, the $C_{10}$–$C_{18}$ alkyl polyglycosides and their corresponding sulfated polyglycosides; $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxylate/propoxylates).

Other preferred optional surfactants include the $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{12}$–$C_{18}$ N-(3-methoxypropyl) glucamide. The N-propyl through N-hexyl $C_{12}$–$C_{18}$ glucamides can be used for low sudsing.

Optionally, $C_8$–$C_{20}$ conventional soaps may also be used. If high sudsing is desired, the branched-chain $C_{10}$–$C_{16}$ soaps may be used.

Mixtures of anionic and nonionic surfactants are especially useful. Other conventional useful surfactants are listed in standard texts.

Adjunct Ingredients—While effective bleach-additives herein may comprise only the bleach activators of the invention, fully-formulated laundry compositions typically will also comprise other adjunct ingredients to improve or modify performance. Typical, non-limiting examples of such ingredients are disclosed hereinafter for the convenience of the formulator.

Bleach catalysts—If desired, the bleaches can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and European Pat. App. Pub. Nos. 549,271A1, 549,272A1, 544,440A2, and 544,490A1; Preferred examples of these catalysts include $Mn^{IV}_2(u\text{-}O)_3(1,4,7\text{-trimethyl-}1,4,7\text{-triazacyclononane})_2\text{-}(PF_6)_2$, $Mn^{III}_2(u\text{-}O)_1(u\text{-}OAc)_2(1,4,7\text{-trimethyl-}1,4,7\text{-triazacyclononane})_2(ClO_4)_2$, $Mn^{IV}_4(u\text{-}O)_6(1,4,7\text{-triazacyclononane})_4(ClO_4)_4$, $Mn^{III}\text{-}Mn^{IV}_4\text{-}(u\text{-}O)_1(u\text{-}OAc)_2\text{-}(1,4,7\text{-trimethyl-}1,4,7\text{-triazacyclo-nonane})_2\text{-}(ClO_4)_3$, $Mn^{IV}\text{-}(4,7\text{-trimethyl-}1,4,7\text{-triazacyclo-nonane})\text{-}(OCH_3)_3(PF_6)$, and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.: 4,728,455; 5,284,944; 5,246,612; 5,256,779; 5,280,117; 5,274,147; 5,153,161; and 5,227,084.

Said manganese can be precomplexed with ethylenediaminedisuccinate or separately added, for example as a sulfate salt, with ethylenediaminedisuccinate. (See U.S. application Ser. No. 08/210,186, filed Mar. 17, 1994.) Other preferred transition metals in said transition-metal-containing bleach catalysts include iron or copper.

Remarkably, preferred embodiments of the present invention in which the wash pH is in the range from about 6.5 to about 9.5 and there is present one of the above-indicated selected performance-enhanced bleach activators in combination with one of the above-indicated bleach catalysts, secure a particularly superior bleaching effect as compared with otherwise identical compositions in which conventional bleach activators such as TAED (see hereinbelow) are used in place of the performance-enhanced bleach activator.

As a practical matter, and not by way of limitation, the bleaching compositions and processes herein can be adjusted to provide on the order of at least one part per ten million of the active bleach catalyst species in the aqueous washing liquor, and will preferably provide from about 0.1 ppm to about 700 ppm, more preferably from about 1 ppm to about 50 ppm, of the catalyst species in the laundry liquor.

Conventional Bleach Activators—"Conventional bleach activators" herein are any bleach activators which do not respect the above-identified provisions given in connection with the performance-boosting bleach activators. Numerous conventional bleach activators are known and are optionally included in the instant bleaching compositions. Various nonlimiting examples of such activators are disclosed in U.S. Pat. No. 4,915,854, issued Apr. 10, 1990 to Mao et al, and U.S. Pat. No. 4,412,934. The nonanoyloxybenzene sulfonate (NOBS) and tetraacetyl ethylenediamine (TAED) activators are typical, and mixtures thereof can also be used. See also U.S. Pat. No. 4,634,551 for other typical conventional bleach activators. Known amido-derived bleach activators are those of the formulae: $R^1N(R^5)C(O)R^2C(O)L$ or $R^1C(O)N(R^5)R^2C(O)L$ wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. Further illustration of optional, conventional bleach activators of the above formulae include (6-octanamido-caproyl) oxybenzenesulfonate, (6-nonanamidocaproyl) oxybenzenesul-fonate, (6-decanamido-caproyl) oxybenzenesulfonate, and mixtures thereof as described in U.S. Pat. No. 4,634,551. Another class of conventional bleach activators comprises the benzoxazin-type activators disclosed by Hodge et al in U.S. Pat. No. 4,966,723, issued Oct. 30, 1990. Still another class of conventional bleach activators includes those acyl lactam activators which do not provide the benefits and criticalities described herein. Examples of optional lactam activators include octanoyl caprolactam, 3,5,5-trimethylhexanoyl caprolactam, nonanoyl caprolactam, decanoyl caprolactam, undecenoyl caprolactam, octanoyl valerolactam, decanoyl valerolactam, undecenoyl valerolactam, nonanoyl valerolactam, 3,5,5-trimethylhexanoyl valerolactam and mixtures thereof.

Bleaching agents other than hydrogen peroxide sources are also known in the art and can be utilized herein as adjunct ingredients. One type of non-oxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from about 0.025% to about 1.25%, by weight, of such bleaches, especially sulfonated zinc phthalocyanine.

Organic Peroxides, especially Diacyl Peroxides—are extensively illustrated in Kirk Othmer, Encyclopedia of Chemical Technology, Vol. 17, John Wiley and Sons, 1982 at pages 27–90 and especially at pages 63–72, all incorporated herein by reference. Suitable organic peroxides, especially diacyl peroxides, are further illustrated in "Initiators for Polymer Production", Akzo Chemicals Inc., Product Catalog, Bulletin No. 88–57, incorporated by reference. Preferred diacyl peroxides herein whether in pure or formulated form for granule, powder or tablet forms of the bleaching compositions constitute solids at 25° C. e.g., CADET® BPO 78 powder form of dibenzoyl peroxide, from Akzo. Highly preferred organic peroxides, particularly the diacyl peroxides, for such bleaching compositions have melting points above 40° C., preferably above 50° C. Additionally, preferred are the organic peroxides with SADT's (as defined in the foregoing Akzo publication) of 35° C. or higher, more preferably 70° C. or higher. Nonlimiting examples of diacyl peroxides useful herein include dibenzoyl peroxide, lauroyl peroxide, and dicumyl peroxide. Dibenzoyl peroxide is preferred. In some instances, diacyl peroxides are available in the trade which contain oily substances such as dioctyl phthalate. In general, particularly for automatic dishwashing applications, it is preferred to use diacyl peroxides which are substantially free from oily phthalates since these can form smears on dishes and glassware.

Quaternary Substituted Bleach Activators—The present compositions can optionally further comprise conventional, known quaternary substituted bleach activators (QSBA). QSBA's are further illustrated in U.S. Pat. No. 4,539,130, Sep. 3, 1985 and U.S. Pat. No. 4,283,301. British Pat. 1,382,594, published Feb. 5, 1975, discloses a class of QSBA's optionally suitable for use herein. U.S. Pat. No. 4,818,426 issued Apr. 4., 1989 discloses another class of QSBA's. Also see U.S. Pat. No. 5,093,022 issued Mar. 3, 1992 and U.S. Pat. No. 4,904,406, issued Feb. 27, 1990. Additionally, QSBA's are described in EP 552,812 A1 published Jul. 28, 1993, and in EP 540,090 A2, published May 5, 1993.

Builders—Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. High performance compositions typically comprise from about 10% to about 80%, more typically from about 15% to about 50% by weight, of the detergent builder. Lower or higher levels of builder, however, are not excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders. See U.S. Pat. No. 4,605,509 for examples of preferred aluminosilicates.

Examples of silicate builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6® is a crystalline layered silicate marketed by Hoechst (commonly abbreviated herein as "SKS-6"). Unlike zeolite builders, the Na SKS-6 silicate builder does not contain aluminum. NaSKS-6 is the $\delta$-$Na_2SiO_5$ morphology form of layered silicate and can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1}yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the $\alpha$-, $\beta$- and $\gamma$-forms. Other silicates may also be useful, such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov.15, 1973. Various grades and types of sodium carbonate and sodium sesquicarbonate may be used, certain of which are particularly useful as carriers for other ingredients, especially detersive surfactants.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula: $[M_z(zAlO_2)_y].xH_2O$ wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula: $Na_{12}[(AlO_2)_{12}(SiO_2)_{12}].xH_2O$ wherein x is from about 20 to about 30, especially about 27. This material is known as Zeolite A. Dehydrated zeolites (x=0-10) may also be used herein. Preferably, the aluminosilicate has a particle size of about 0.1–10 microns in diameter. As with other builders such as carbonates, it may be desirable to use zeolites in any physical or morphological form adapted to promote surfactant carrier function, and appropriate particle sizes may be freely selected by the formulator.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt or "overbased". When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty laundry detergent formulations due to their availability from renewable resources and their biodegradability. Citrates can also be used in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Chelating Agents—The compositions herein may also optionally contain one or more iron and/or manganese and/or copper chelating agents, e.g., diethylenetraminepenta acetic acid (DTPA). More generally, chelating agents suitable for use herein can be selected from the group consisting of aminocarboxylates, aminophosphonates, polyfunctionally-substituted aromatic chelating agents and mixtures thereof. Without intending to be bound by theory, it is believed that the benefit of these materials is due in part to their exceptional ability to remove iron and manganese ions from washing solutions by formation of soluble chelates; other benefits include inorganic film or scale prevention. Other suitable chelating agents for use herein are the commercial DEQUEST® series, and chelants from Monsanto, DuPont, and Nalco, Inc. Aminocarboxylates useful as optional chelating agents include ethylenediaminetetracetates, N-hydroxyethylethylenediaminetriacetates, nitrilotriacetates, ethylenediamine tetraproprionates, triethylene-tetraaminehexacetates, diethylenetriamine-pentaacetates, and ethanoldiglycines, alkali metal, ammonium, and substituted ammonium salts therein and mixtures therein.

Aminophosphonates are also suitable for use as chelating agents in the compositions of the invention when at least low levels of total phosphorus are permitted in detergent compositions, and include ethylenediaminetetrakis (methylenephosphonates). Preferably, these aminophosphonates do not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A highly preferred biodegradable chelator for use herein is ethylenediamine disuccinate ("EDDS"), especially (but not limited to) the [S,S] isomer as described in U.S. Pat. No. 4,704,233, Nov. 3, 1987, to Hartman and Perkins. The trisodium salt is preferred though other forms, such as magnesium salts, may also be useful.

If utilized, these chelating agents or transition-metal-selective sequestrants will preferably comprise from about 0.001% to about 10%, more preferably from about 0.05% to about 1% by weight of the bleaching detergent compositions herein.

Enzymes—Enzymes can be included in the formulations herein for a wide variety of fabric laundering or other cleaning purposes, including removal of protein-based, carbohydrate-based, or triglyceride-based stains, for example, and for the prevention of refugee dye transfer, and for fabric restoration. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders, etc.. In this respect bacterial or fungal enzymes are preferred, such as bacterial amylases and proteases, and fungal cellulases.

Enzymes are normally incorporated at levels sufficient to provide up to about 5 mg by weight, more typically about 0.01 mg to about 3 mg, of active enzyme per gram of the composition. Stated otherwise, the compositions herein will typically comprise from about 0.001% to about 5%, preferably 0.01%–1% by weight of a commercial enzyme preparation. Protease enzymes are usually present in such commercial preparations at levels sufficient to provide from 0.005 to 0.1 Anson units (AU) of activity per gram of composition.

Suitable examples of proteases are the subtilisins which are obtained from particular strains of *B. subtilis* and *B. licheniformis*. Another suitable protease is obtained from a strain of Bacillus, having maximum activity throughout the pH range of 8–12, developed and sold by Novo Industries A/S as ESPERASE®. The preparation of this enzyme and analogous enzymes is described in British Patent Specification No. 1,243,784 of Novo. Proteolytic enzymes suitable for removing protein-based stains that are commercially available include those sold under the tradenames ALCALASE® and SAVINASE® by Novo Industries A/S (Denmark) and MAXATASE® by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985).

An especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76 in combination with one or more amino acid residue positions equivalent to those selected from the group consisting of +99, +101, +103, +107 and +123 in *Bacillus amyloliquefaciens* sbtilisin as described in the patent applications of A. Baeck, C. K. Ghosh, P. P. Greycar, R. R. Bott and L. J. Wilson, entitled "Protease-Containing Cleaning Compositions" having U.S. Ser. No. 08/136,797 (P&G Case 5040), and "Bleaching Compositions Comprising Protease Enzymes" having U.S. Ser. No. 08/136,626.

Amylases include, for example, α-amylases described in British Patent Specification No. 1,296,839 (Novo), RAPIDASE®, International Bio-Synthetics, Inc. and TERMAMYL®, Novo Industries.

Cellulases usable in the present invention include both bacterial or fungal cellulases. Preferably, they will have a pH optimum of between 5 and 9.5. Suitable cellulases are disclosed in U.S. Pat. No. 4,435,307, Barbesgoard et al, issued Mar. 6, 1984, which discloses fungal cellulase produced from *Humicola insolens* and Humicola strain DSM1800 or a cellulase 212-producing fungus belonging to the genus Aeromonas, and cellulase extracted from the hepatopancreas of a marine mollusk (Dolabella Auricula Solander). Suitable cellulases are also disclosed in GB-A-2.075.028; GB-A-2.095.275 and DE-OS-2.247.832. CAREZYME® (Novo) is especially useful.

Suitable lipase enzymes for detergent use include those produced by microorganisms of the Pseudomonas group, such as *Pseudomonas stuizeri* ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex *Chromobacter viscosum*, e.g. *Chromobacter viscosum* var. lipolyticum NRRLB 3673, commercially available from Toyo Jozo Co., Tagata, Japan; and further *Chromobacter viscosum* lipases from U.S. Biochemical Corp., U.S.A. and Disoynth Co., The Netherlands, and lipases ex *Pseudomonas gladioli*. The LIPOLASE® enzyme derived from *Humicola lanuginosa* and commercially available from Novo (see also EPO 341,947) is a preferred lipase for use herein.

Peroxidase enzymes can be used in combination with oxygen sources, e.g., percarbonate, perborate, persulfate, hydrogen peroxide, etc. They are used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985. Enzyme materials useful for liquid detergent formulations, and their incorporation into such formulations, are disclosed in U.S. Pat. No. 4,261,868, Hora et al, issued Apr. 14, 1981. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

Polymeric Soil Release Agent—Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate), having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, and such cellulose derivatives are amphiphilic, whereby they have a sufficient level of $C_1$–$C_4$ alkyl ether and/or $C_4$ hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b).

Typically, the polyoxyethylene segments of (a)(i) will have a degree of polymerization of from about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful in the present invention also include cellulosic derivatives such as hydroxyether cellulosic polymers, copolymeric blocks of ethylene terephthalate or propylene terephthalate with polyethylene oxide or polypropylene oxide terephthalate, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units containing 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoaroyl, end-capped terephthalate esters.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. These sulfo-end-capeed soil release agents also comprise from about 0.5% to about 20%, by weight of the oligomer, of a crystalline-reducing stabilizer, preferably selected from the group consisting of xylene sulfonate, cumene sulfonate, toluene sulfonate, and mixtures thereof.

If utilized, soil release agents will typically comprise from about 0.01% to about 10.0%, by weight, of the detergent compositions herein, typically from about 0.1% to about 5%, preferably from about 0.2% to about 3.0%.

Other Ingredients—Usual detersive ingredients can include one or more other detersive adjuncts or other materials for assisting or enhancing cleaning performance, treatment of the substrate to be cleaned, or to modify the aesthetics of the detergent composition. Usual detersive adjuncts of detergent compositions include the ingredients set forth in U.S. Pat. No. 3,936,537, Baskerville et al.

Adjuncts which can also be included in detergent compositions employed in the present invention, in their conventional art-established levels for use (generally from 0% to about 20% of the detergent ingredients, preferably from about 0.5% to about 10%), include other active ingredients such as dispersant polymers from BASF Corp. or Rohm & Haas; color speckles, anti-tarnish and/or anti-corrosion agents, dyes, fillers, optical brighteners, germicides, alkalinity sources, hydrotropes, anti-oxidants, enzyme stabilizing agents, perfumes, solubilizing agents, clay soil removal/anti-redeposition agents, carriers, processing aids, pigments, solvents for liquid formulations, fabric softeners, static control agents, solid fillers for bar compositions, etc. Dye transfer inhibiting agents, including polyamine N-oxides such as polyvinylpyridine N-oxide can be used. Dye-transfer-inhibiting agents are further illustrated by polyvinylpyrrolidone and copolymers of N-vinyl imidazole and N-vinyl pyrrolidone. If high sudsing is desired, suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$ , and the like, can be added at levels of, typically, 0.1%–2%, to provide additional suds and to enhance grease removal performance.

Brightener—Any optical brighteners or other brightening or whitening agents known in the art can be incorporated at levels typically from about 0.05% to about 1.2%, by weight, into the detergent compositions herein. Commercial optical brighteners which may be useful in the present invention can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Artic White CC and Artic White CWD, available from Hilton-Davis, located in Italy; the 2-(4-stryl-phenyl)-2H-napthol[1,2-d]triazoles; 4,4'-bis- (1,2, 3-triazol-2-yl)-stil- benes; 4,4'-bis(stryl)bisphenyls; and the aminocoumarins. Specific examples of these brighteners include 4-methyl-7-diethyl- amino coumarin; 1,2-bis(-venzimidazol-2-yl)ethylene; 1,3-diphenyl-phrazolines; 2,5-bis(benzoxazol-2-yl)thiophene; 2-stryl-napth-[1,2-d] oxazole; and 2-(stilbene-4-yl)-2H-naphtho- [1,2-d]triazole. See also U.S. Pat. No. 3,646,015, issued Feb. 29, 1972 to Hamilton. Anionic brighteners are preferred herein.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT® D10, Degussa) is admixed with a proteolytic enzyme solution containing 3%–5% of $C_{13-15}$ ethoxylated alcohol (EO 7) nonionic surfactant. Typically, the enzyme/surfactant solution is 2.5 X the weight of silica. The resulting powder is dispersed with stirring in silicone oil (various silicone oil viscosities in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

Bleaching compositions in granular form typically limit water content, for example to less than about 12% free water, for best storage stability.

Storage stability of bleaching detergent compositions can be further enhanced by limiting the content in the compositions of adventitious redox-active substances such as rust and other traces of transition metals in undesirable form. Certain bleaching compositions may moreover be limited in their total halide ion content, or may have any particular halide, e.g., bromide, substantially absent. Bleach stabilizers such as stannates can be added for improved stability and liquid formulations may be substantially nonaqueous if desired.

The following examples illustrate the bleach activators of the invention and bleaching detergent compositions which can be prepared using the bleach activators, but are not intended to be limiting thereof. All material in Examples I–XXX satisfy the functional limitations herein.

EXAMPLE I

N-[(4-methylsulfonyl)benzoyl] caprolactam:

All glassware is dried thoroughly, and the reaction kept under an inert atmosphere (argon) at all times.

With stirring, 5.0 g (25.0 mmol) of (4-methylsulfonyl) benzoic acid (Aldrich) and 5.5 mL (75.0 mmol) of thionyl chloride (Aldrich, d=1.631 g/mol) are added to 100 mL tetrahydrofuran (THF—Aldrich, BPLC grade) in a 3-neck round bottom flask equipped with a reflux condenser, addition funnel, and magnetic stirrer. The resulting reaction mixture is heated to reflux and stirred for 16 h. After cooling to room temperature, the solvent and excess thionyl chloride are removed by evaporation under reduced pressure. Recrystallization of the solid residue from toluene followed by drying under high vacuum yields pure (4-methylsulfonyl) benzoyl chloride as a white, crystalline solid.

In a subsequent reaction, 2.33 g (20.6 mmol) of caprolactam (Aldrich) and 2.30 g (22.7 mmol) of triethylamine (Aldrich, d=0.726 g/mol) are added to 50 mL THF (Aldrich, HPLC grade) in a 3-neck round bottom flask equipped with a reflux condenser, addition funnel, and magnetic stirrer. Addition of a solution of 4.50 g (20.6 mmol) of the (4-methylsulfonyl)-benzoyl chloride in 50 mL THF proceeds dropwise over a period of 30 min, and the resulting reaction mixture is heated to reflux and stirred for 16 h. Upon cooling to room temperature, the THF is removed by evaporation under reduced pressure. The solid residue is redissolved in chloroform, and extracted several times with D.I. water. The organic layer is dried over $Na_2SO_4$, filtered, concentrated by removal of solvent, and poured into hexane to precipitate the product. The precipitate is collected by suction filtration, rinsed with hexane, and dried under vacuum to yield N-[(4-methylsulfonyl)benzoyl] caprolactam as a white, crystalline solid.

EXAMPLE II

N-[(4-methylsulfonyl)benzoyl]valerolactam:

Synthesized as for N-[(4-methylsulfonyl)benzoyl] caprolactam (Example I) using valerolactam (Aldrich) in place of caprolactam.

EXAMPLE III

N-[(4-ethylsulfonyl)benzoyl]caprolactam:

The synthesis of N-[(4-ethylsulfonyl)benzoyl] caprolactam proceeds as for N- [(4-methylsulfonyl)benzoyl] caprolactam (Example I) using (4-ethylsulfonyl)benzoic acid in place of (4-methylsulfonyl)benzoic acid.

The (4-ethylsulfonyl)benzoic acid can be synthesized from 2-chloropropionic acid and 4-(chlorosulfonyl)benzoic acid according to the procedure of Brown, R. W. *J. Org. Chem.* 1991, 56, 4974–4976.

EXAMPLE IV

N-[(4-ethylsulfonyl)benzoyl]valerolactam:

Synthesized as for N-[(4-ethylsulfonyl)benzoyl] caprolactam (Example III) using valerolactam (Aldrich) in place of caprolactam.

EXAMPLE V

N-[(4-pentylsulfonyl)benzoyl]caprolactam:

Synthesized as for N-[(4-ethylsulfonyl)benzoyl] caprolactam (Example III) using 2-bromohexanoic acid (Aldrich) in place of 2-chloropropionic acid.

EXAMPLE VI

N-[(4-pentylsulfonyl)benzoyl]valerolactam:

Synthesized as for N-[(4-pentylsulfonyl)benzoyl] caprolactam (Example V) using valerolactam (Aldrich) in place of caprolactam.

EXAMPLE VII

N-[(4-heptysulfonyl)benzoyl]caprolactam:

Synthesized as for N-[(4-ethylsulfonyl)benzoyl] caprolactam (Example III) using 2-bromooctanoic acid (Aldrich) in place of 2-chloropropionic acid.

EXAMPLE VIII

N-[(4-heptylsulfonyl)benzoyl]valerolactam:

Synthesized as for N-[(4-heptylsulfonyl)benzoyl] caprolactam (Example VII) using valerolactam (Aldrich) in place of caprolactam.

EXAMPLE IX

N-(2-furoyl)valerolactam:

All glassware is dried thoroughly, and the reaction is kept under an inert atmosphere (argon) at all times. With stirring, 20.0 g (0.18 mol) of 2-furoic acid (Aldrich) and 40.0 mL (0.53 mol) of thionyl chloride (Aldrich, d=1.631 g/mol) are added to 300 mL THF (Aldrich, HPLC grade) in a single-neck round bottom flask equipped with a reflux condenser and magnetic stirrer. The resulting reaction mire is heated to reflux and stirred for 16 h. After cooling to room temperature, the solvent and excess thionyl chloride are removed by evaporation under reduced pressure to yield 2-furoyl chloride.

In a subsequent reaction, 9.2 g (92 mmol) of valerolactam (Aldrich) and 14.1 mL (101 mmol) of triethylamine (Aldrich, d=0.726 g/mol) are added to 150 mL THF (Aldrich, HPLC grade) in a 3-neck round bottom flask equipped with a reflux condenser, addition funnel, and magnetic stirrer. Addition of a solution of 12.0 g (92 mmol) of the 2-furoyl chloride in 150 mL THF proceeds dropwise over a period of 30 min, and the resulting reaction mixture is heated to reflux and stirred for 16 h. Upon cooling to room temperature, the THF is removed by evaporation under reduced pressure. The solid residue is redissolved in methylene chloride, and extracted several times with 5% aqueous hydrochloric and then deionized water. The organic layer is dried over $Na_2SO_4$, filtered, concentrated by removal of solvent, and poured into hexane to precipitate the product. The precipitate is collected by suction filtration, rinsed with hexane, and dried under vacuum to yield N-(2-furoyl) valerolactam as a white, crystalline solid.

EXAMPLE X

N-(2-furoyl)caprolactam:

Synthesized as for N-(2-furoyl)valerolactam (Example IX) using caprolactam (Aldrich) in place of valerolactam.

EXAMPLE XI

N-(3-furoyl)caprolactam:

Synthesized as for N-(2-furoyl)caprolactam (Example X) using 3-furoic acid in place of 2-furoic acid.

EXAMPLE XII

N-(3-furoyl)valerolactam:

Synthesized as for N-(3-furoyl)caprolactam (Example XI) using valerolactam (Aldrich) in place of caprolactam.

EXAMPLE XIII

N-(5-nitro-2-furoyl)caprolactam:

Synthesized as for N-(2-furoyl)caprolactam (Example XI) using 5-nitro-2-furoic acid in place of 2-furoic acid.

EXAMPLE XIV

N-(5-nitro-2-furoyl)valerolactam:

Synthesized as for N-(5-nitro-2-furoyl)caprolactam (Example XIII) using valerolactam (Aldrich) in place of caprolactam.

EXAMPLE XV

N-(5-bromo-2-furoyl)caprolactam:

Synthesized as for N-(2-furoyl)caprolactam (Example X) using 5-bromo-2-furoic acid in place of 2-furoic acid.

EXAMPLE XVI

N-(5-bromo-2-furoyl)valerolactam:

Synthesized as for N-(5-bromo-2-furoyl)caprolactam (Example XV) using valerolactam (Aldrich) in place of caprolactam.

EXAMPLE XVII

N-(1-naphthoyl)caprolactam:

Synthesized as for N-(2-furoyl)caprolactam (Example X) using 1-naphthoic acid in place of 2-furoic acid.

EXAMPLE XVIII

N-(1-naphthoyl)valerolactam:

Synthesized as for N-(1-naphthoyl)caprolactam (Example XVII) using valerolactam (Aldrich) in place of caprolactam.

EXAMPLE XIX

N-(3,5-dinitrobenzoyl)caprolactam:

All glassware is dried thoroughly, and the reaction is kept under an inert atmosphere (argon) at all times. With stirring, 2.33 g (20.6 mmol) of caprolactam (Aldrich) and 2.30 g (22.7 mmol) of triethylamine (Aldrich, d=0.726 g/mol) are added to 100 mL toluene (Aldrich) in a 3-neck round bottom flask equipped with a reflux condenser, addition funnel, and mechanical stirrer, to give a clear, pale yellow solution. Addition of a solution of 4.75 g (20.6 mmol) of 3,5-dinitrobenzoyl chloride (Aldrich) in 100 mL toluene proceeds dropwise over a period of 30 min. The resulting reaction mixture is heated to reflux and stirred for 16 h. Upon cooling to room temperature, the reaction is filtered to remove the triethylamine hydrochloride, and poured into a separatory funnel. After dilution with 300 mL of chloroform, the organic solution is extracted with 5% aq HCl, 5% aq NaOH, and finally D.I. water. The organic layer is dried over $Na_2SO4$, filtered, and the solvent removed by evaporation under reduced pressure. Recrystallization of the crude product from toluene followed by drying under vacuum yields N-(3,5-dinitrobenzoyl)caprolactam as a light yellow, crystalline solid.

EXAMPLE XX

N-(3,5-dinitrobenzoyl)valerolactam:

Synthesized as for N-(3,5-dinitrobenzoyl)caprolactam (Example XIX) using valerolactam (Aldrich) in place of caprolactam.

EXAMPLE XXI

N-(3,5-dichlorobenzoyl)caprolactam:

Synthesized as for N-(4-nitrobenzoyl)caprolactam (Example XXIII) using 3,5-dichlorobenzoylchloride (Aldrich) in place of 4-nitrobenzoyl chloride.

EXAMPLE XXII

N-(3,5-dichlorobenzoyl)valerolactam:

Synthesized as for N-(3,5-dichlorobenzoyl)caprolactam (Example XXI) using valerolactam (Aldrich) in place of caprolactam.

Examples XXIII–XXX exemplify methods for synthesizing compounds generically disclosed in prior references.

EXMPLE XXIII

N-(4-nitrobenzoyl)caprolactam:

All glassware is dried thoroughly, and the reaction is kept under an inert atmosphere (argon) at all times. With stirring, 43.0 g (0.38 mol) of caprolactam (Aldrich) and 58.2 mL (0.42 mol) of triethylamine (Aldrich, d=0.726 g/mol) is added to 150 mL THF (Aldrich, HPLC grade) in a 3-neck round bottom flask equipped with a reflux condenser, addition funnel, and mechanical stirrer, to give a clear, pale yellow solution. Addition of a solution of 70.5 g (0.38 mol) of 4-nitrobenzoyl chloride (Aldrich) in 100 mL THF proceeds dropwise over a period of 1 h. The cloudy, dark yellow reaction mixture is heated to reflux and stirred for 16 h.

Upon cooling to room temperature, the reaction is filtered to remove the triethylamine hydrochloride, and poured into a separatory funnel. After dilution with chloroform, the organic solution is extracted twice 5% aq HCl, twice with 5% aq NaOH, and finally once with neutral D.I. water. The organic layer is dried over $Na_2SO_4$ or $MgSO_4$, filtered, and the solvent removed by evaporation under reduced pressure. Recrystallization of the crude product from toluene followed by drying under vacuum yields N-(4-nitrobenzoyl) caprolactam as a light yellow, crystalline solid.

EXAMPLE XXIV

N-(4-nitrobenzoyl)valerolactam:

Synthesized as for N-(4-nitrobenzoyl)caprolactam (Example XXIII using valerolactam (Aldrich) in place of caprolactam.

EXAMPLE XXV

N-(3-nitrobenzoyl)caprolactam:

Synthesized as for N-(4-nitrobenzoyl)caprolactam (Example XXIII) using 3-nitrobenzoyl chloride (Aldrich) in place of 4-nitrobenzoyl chloride.

EXAMPLE XXVI

N-(3-nitrobenzoyl)valerolactam:

Synthesized as for N-(3-nitrobenzoyl)caprolactam (Example XXV) using valerolactam (Aldrich) in place of caprolactam.

EXAMPLE XXVII

N-(3-chlorobenzoyl)caprolactam:

Synthesized as for N-(4-nitrobenzoyl)caprolactam (Example XXIII using 3-chlorobenzoyl chloride (Aldrich) in place of 4-nitrobenzoyl chloride.

EXAMPLE XXVIII

N-(3-chlorobenzoyl)valerolactam:

Synthesized as for N-(3-chloroobenzoyl)caprolactam (Example XXVII using valerolactam (Aldrich) in place of caprolactam.

EXAMPLE XXIX

N-(4-chlorobenzoyl)caprolactam:

Synthesized as for N-(4-nitrobenzoyl)caprolactam (Example XXIII) using 4-chlorobenzoylchloride (Aldrich) in place of 4-nitrobenzoyl chloride.

EXAMPLE XXX

N-(4-chlorobenzoyl)valerolactam:

Synthesized as for N-(4-chlorobenzoyl)caprolactam (Example XXIX using valerolactam (Aldrich) in place of caprolactam.

EXAMPLE XXXI

Bleaching detergent compositions having the form of granular laundry detergents are exemplified by the following formulations.

| | A | B | C | D | E |
|---|---|---|---|---|---|
| Bleach Activator* | 2.30 | 2.30 | 3.00 | 4.60 | 2.30 |
| Sodium Percarbonate | 5.30 | 0.00 | 0.00 | 12.00 | 0.00 |
| Sodium Perborate Monohydrate | 0.00 | 5.30 | 9.00 | 0.00 | 5.30 |
| Linear Alkylbenzene-sulfonate | 12.00 | 0.00 | 12.00 | 0.00 | 21.00 |
| C45AE0.6S | 0.00 | 15.00 | 0.00 | 15.00 | 0.00 |
| C2 Dimethylamine N-Oxide | 0.00 | 2.00 | 0.00 | 2.00 | 0.00 |
| C12 Coco Amidopropyl Betaine | 1.50 | 0.00 | 1.50 | 0.00 | 0.00 |
| Palm N- Methyl Glucamide | 1.70 | 2.00 | 1.70 | 2.00 | 0.00 |
| C12 Dimethylhydroxy-ethylammonium Chloride | 1.50 | 0.00 | 1.50 | 0.00 | 0.00 |
| AE23-6.5T | 2.50 | 3.50 | 2.50 | 3.50 | 1.00 |
| C25E3S | 4.00 | 0.00 | 4.00 | 0.00 | 0.00 |
| Conventional Activator (NOBS) | 0.00 | 0.00 | 0.00 | 0.00 | 0.00 |
| Conventional Activator (TAED) | 0.00 | 0.00 | 0.00 | 0.00 | 0.00 |
| Sodium Tripoly-phosphate | 25.00 | 25.00 | 15.00 | 15.00 | 25.00 |
| Zeolite A | 0.00 | 0.00 | 0.00 | 0.00 | 0.00 |
| Acrylic Acid/Maleic Acid Copolymer | 0.00 | 0.00 | 0.00 | 0.00 | 1.00 |
| Polyacrylic Acid, partially neutralized | 3.00 | 3.00 | 3.00 | 3.00 | 0.00 |
| Soil Release Agent | 0.00 | 0.00 | 0.50 | 0.40 | 0.00 |
| Carboxymethylcellulose | 0.40 | 0.40 | 0.40 | 0.40 | 0.40 |
| Sodium Carbonate | 2.00 | 2.00 | 2.00 | 0.00 | 8.00 |
| Sodium Silicate | 3.00 | 3.00 | 3.00 | 3.00 | 6.00 |
| Sodium Bicarbonate | 5.00 | 5.00 | 5.00 | 5.00 | 5.00 |
| Savinase (4T) | 1.00 | 1.00 | 1.00 | 1.00 | 0.60 |
| Termamyl (60T) | 0.40 | 0.40 | 0.40 | 0.40 | 0.40 |

-continued

| | A | B | C | D | E |
|---|---|---|---|---|---|
| Lipolase (100T) | 0.12 | 0.12 | 0.12 | 0.12 | 0.12 |
| Carezyme (5T) | 0.15 | 0.15 | 0.15 | 0.15 | 0.15 |
| Diethylenetriaminepenta (methylenephosphonic Acid) | 1.60 | 1.60 | 1.60 | 1.60 | 0.40 |
| Brightener | 0.20 | 0.20 | 0.20 | 0.05 | 0.20 |
| Sulfonated Zinc Phthalocyanine Photobleach | 0.50 | 0.00 | 0.25 | 0.00 | 0.00 |
| MgSO4 | 2.20 | 2.20 | 2.20 | 2.20 | 0.64 |
| Na2SO4 | balance | balance | balance | balance | balance |

Any of the above compositions is used to launder fabrics at a concentration of 3500 ppm in water, 25° C., and a 15:1 water:cloth ratio. The typical pH is about 9.5 but can be can be adjusted by altering the proportion of acid to Na- salt form of alkylbenzenesulfonate. Results are excellent, particularly with respect to bleaching as compared with otherwise identical compositions in which TAED, NOBS or benzoylcaprolactam are used at equal weight as a complete replacement for the essential bleach activator. In particular, novel performance-enhanced bleach activators, such as those of Examples III-XII, provide superior results and are highly preferred.

EXAMPLE XXXII

Bleaching detergent compositions having the form of granular laundry detergents are exemplified by the following formulations.

| | A | B | C | D | E |
|---|---|---|---|---|---|
| Bleach Activator* | 2.30 | 3.00 | 2.30 | 1.75 | 2.00 |
| Sodium Percarbonate | 5.30 | 0.00 | 0.00 | 0.00 | 0.00 |
| Sodium Perborate Monohydrate | 0.00 | 9.00 | 17.60 | 9.00 | 9.00 |
| Linear Alkylbenzene-sulfonate | 21.00 | 12.00 | 0.00 | 12.00 | 12.00 |
| C4SAE0.68 | 0.00 | 0.00 | 15.00 | 0.00 | 0.00 |
| C2 Dimethylamine N-Oxide | 0.00 | 0.00 | 2.00 | 0.00 | 0.00 |
| C12 Coco Amidopropyl Betaine | 0.00 | 1.50 | 0.00 | 1.50 | 1.50 |
| Palm N- Methyl Glucamide | 0.00 | 1.70 | 2.00 | 1.70 | 1.70 |
| C12 Dimethylhydroxy-ethylammonium Chloride | 1.00 | 1.50 | 0.00 | 1.50 | 1.50 |
| AE23-6.5T | 0.00 | 2.50 | 3.50 | 2.50 | 2.50 |
| C25E3S | 0.00 | 4.00 | 0.00 | 4.00 | 4.00 |
| Conventional Activator (NOBS) | 0.00 | 0.00 | 0.00 | 1.50 | 0.00 |
| Conventional Activator (TAED) | 0.00 | 0.00 | 0.00 | 0.00 | 1.00 |
| Sodium Tripoly-phosphate | 25.00 | 15.00 | 25.00 | 15.00 | 15.00 |
| Zeolite A | 0.00 | 0.00 | 0.00 | 0.00 | 0.00 |
| Acrylic Acid/Maleic Acid Copolymer | 0.00 | 0.00 | 0.00 | 0.00 | 0.00 |
| Polyacrylic Acid, partially neutralized | 0.00 | 3.00 | 3.00 | 3.00 | 3.00 |
| Soil Release Agent | 0.30 | 0.50 | 0.00 | 0.50 | 0.50 |
| Carboxymethylcellulose | 0.00 | 0.40 | 0.40 | 0.40 | 0.40 |
| Sodium Carbonate | 0.00 | 2.00 | 2.00 | 2.00 | 2.00 |
| Sodium Silicate | 6.00 | 3.00 | 3.00 | 3.00 | 3.00 |
| Sodium Bicarbonate | 2.00 | 5.00 | 5.00 | 5.00 | 5.00 |
| Savinase (4T) | 0.60 | 1.00 | 1.00 | 1.00 | 1.00 |
| Termamyl (60T) | 0.40 | 0.40 | 0.40 | 0.40 | 0.40 |
| Lipolase (100T) | 0.12 | 0.12 | 0.12 | 0.12 | 0.12 |
| Carezyme (5T) | 0.15 | 0.15 | 0.15 | 0.15 | 0.15 |
| Diethylenetriaminepenta (methylenephosphonic Acid) | 0.40 | 0.00 | 1.60 | 0.00 | 0.00 |
| Brightener | 0.20 | 0.30 | 0.20 | 0.30 | 0.30 |
| Sulfonated Zinc Phthalocyanine Photobleach | 0.25 | 0.00 | 0.00 | 0.00 | 0.00 |
| MgSO4 | 0.64 | 0.00 | 2.20 | 0.00 | 0.00 |
| Na2SO4 | balance | balance | balance | balance | balance |

Any of the above compositions is used to launder fabrics at a concentration of 3500 ppm in water, 25° C., and a 15:1 water:cloth ratio. The typical pH is about 9.5 but can be can be adjusted by altering the proportion of acid to Na- salt form of alkylbenzenesulfonate. Results are excellent, particularly with respect to bleaching as compared with otherwise identical compositions in which TAED, NOBS or benzoylcaprolactam are used at equal weight as a complete replacement for the essential bleach activator. In particular, novel performance-enhanced bleach activators, such as those of Examples III–XII, provide superior results and are highly preferred.

EXAMPLE XXXIII

Bleaching detergent compositions having the form of granular laundry detergents are exemplified by the following formulations.

| | A | B |
|---|---|---|
| Bleach Activator* | 2.30 | 4.60 |
| Sodium Percarbonate | 5.30 | 12.00 |
| Sodium Perborate Monohydrate | 0.00 | 0.00 |
| Linear Alkylbenzenesulfonate | 12.00 | 0.00 |
| C45AE0.6S | 0.00 | 15.00 |
| C2 Dimethylamine N-Oxide | 0.00 | 2.00 |
| C12 Coco Amidopropyl Betaine | 1.50 | 0.00 |
| Palm N- Methyl Glucamide | 1.70 | 2.00 |
| C12 Dimethylhydroxyethylammonium Chloride | 1.50 | 0.00 |
| AE23-6.5T | 2.50 | 3.50 |
| C25E35 | 4.00 | 0.00 |
| Conventional Activator (NOBS) | 0.00 | 0.00 |
| Conventional Activator (TAED) | 0.00 | 0.00 |
| Sodium Tripolyphosphate | 25.00 | 0.00 |
| Zeolite A | 0.00 | 20.00 |
| Acrylic Acid/Maleic Acid Copolymer | 0.00 | 0.00 |
| Polyacrylic Acid, partially neutralized | 3.00 | 3.00 |
| Soil Release Agent | 0.00 | 0.40 |
| Carboxymethylcellulose | 0.40 | 0.40 |
| Sodium Carbonate | 2.00 | 0.00 |
| Sodium Silicate | 3.00 | 3.00 |
| Sodium Bicarbonate | 5.00 | 5.00 |
| Savinase (4T) | 0.00 | 1.00 |
| Termamyl (60T) | 0.00 | 0.40 |
| Lipolase (100T) | 0.00 | 0.12 |
| Carezyme (5T) | 0.00 | 0.15 |
| Diethylenetriaminepenta(methylenephosphonic Acid) | 1.60 | 1.60 |
| Brightener | 0.20 | 0.05 |
| Sulfonated Zinc Phthalocyanine Photobleach | 0.50 | 0.00 |
| MgSO4 | 2.20 | 2.20 |
| Na2SO4 | balance | balance |

Any of the above compositions is used to launder fabrics at a concentration of 3500 ppm in water, 25° C., and a 15:1 water:cloth ratio. The typical pH is about 9.5 but can be can be adjusted by altering the proportion of acid to Na- salt form of alkylbenzenesulfonate. Results are excellent, particularly with respect to bleaching as compared with otherwise identical compositions in which TAED, NOBS or benzoylcaprolactam are used at equal weight as a complete replacement for the essential bleach activator. In particular, novel performance-enhanced bleach activators, such as those of Examples III–XII, provide superior results and are highly preferred.

EXAMPLE XXXIV

Bleaching compositions having the form of granular laundry detergents are identical to those of any of Examples XXXI–XXXIII. Any of the compositions is used to launder fabrics under "high soil" conditions. "High soil" conditions are achieved in either of two possible modes. In a first mode, consumer bundles of heavily soiled fabrics can be used, the soil level being sufficiently high that when a portion of the composition is dissolved in the presence of tap-water together with the soiled fabrics in a U.S. domestic washing-machine, the pH of the wash water is in the range from about pH 6.5 to about 9.5, more typically from about 7 to about 9.5. Alternatively, it is convenient for testing purposes when heavily soiled fabrics are unavailable, to use the following procedure: the pH of the wash bath after dissolution of product and addition of the test fabrics is adjusted using aqueous HCl such that the pH is in the range from about pH 6.5 to about 9.5. The test fabrics are a lightly soiled or clean bundle of consumer fabrics; additional test swatches of fabric comprising bleachable stains are typically added.

The fabrics are washed at about 25° C. with excellent results, particularly with respect to bleaching as compared with otherwise identical compositions in which TAED, NOBS or benzoylcaprolactam are used at equal weight as a complete replacement for the *-identified bleach activator. In particular, novel performance-enhanced bleach activators such as those of Examples III–XIII provide superior results and are highly preferred.

EXAMPLE XXXV

A bleaching detergent powder comprises the following ingredients:

| Component | Weight % |
|---|---|
| Bleach Activator according to any of Examples I–XXX | 5 |
| Sodium Perborate Tetrahydrate | 10 |
| C12 linear alkyl benzene sulfonate | 8 |
| Phosphate (as sodium tripolyphosphate) | 9 |
| Sodium carbonate | 20 |
| Talc | 15 |
| Brightener, perfume | 0.3 |
| Sodium Chloride | 25 |
| Water and Minors* | Balance to 100% |

EXAMPLE XXXVI

A laundry bar suitable for hand-washing soiled fabrics is prepared by standard extrusion processes and comprises the following:

| Component | Weight % |
|---|---|
| Bleach Activator according to any of Examples I–XXX | 4 |
| Sodium Perborate Tetrahydrate | 12 |
| C12 linear alkyl benzene sulfonate | 30 |
| Phosphate (as sodium tripolyphosphate) | 10 |

-continued

| Component | Weight % |
|---|---|
| Sodium carbonate | 5 |
| Sodium pyrophosphate | 7 |
| Coconut monoethanolamide | 2 |
| Zeolite A (0.1–1.0 micron) | 5 |
| Carboxymethylcellulose | 0.2 |
| Polyacrylate (m.w. 1400) | 0.2 |
| Brightener, perfume | 0.2 |
| Protease | 0.3 |
| $CaSO_4$ | 1 |
| $MgSO_4$ | 1 |
| Water | 4 |
| Filler* | Balance to 100% |

*Can be selected from convenient materials such as $CaCO_3$, talc, clay, silicates, and the like. Acidic fillers can be used to reduce pH. Fabrics are washed with the bar with excellent results.

What is claimed is:

1. A bleaching detergent composition comprising:

(a) from about 0.1% to about 20% of a bleach activator having the formula RC(O)-L which produces a peracid RC(O)—OOH on perhydrolysis; wherein R is selected from the group consisting of substituted phenlyl, furan, substituted furan, 1-napthyl, substituted 1-nathyl and substituted 2-naphthyl and L is a leaving group selected from the group consisting of lactams and 4.5 dihydroimidazoles; said bleach activator having a perhydrolysis selectivity coefficient, $Kp/K_D$ of at least about 5 and a low-pH perhydrolysis-efficiency coefficient of at least about 0.15, and (b) from about 0.2% to about 40% by weight of a hydrogen peroxide source: said bleaching composition having low soil resistivity.

2. A bleaching detergent composition, according to claim 1, further comprising (c) from about 0.1 % to about 50 % of pH-reducing nonsoap detersive ingredients.

3. A composition according to claim 1 wherein said components (b) and (a) are at a ratio of from about 3:1 to about 20:1, as expressed on a basis of (b):(a) in units of moles $H_2O_2$ delivered by said hydrogen peroxide source to moles bleach activator.

4. A composition according to claim 3 wherein said pH-reducing nonsoap detersive ingredients consist essentially of from about 1% to about 25% of one or more members selected from the group consisting of:

(i) nonsoap ionic detersive surfactants;

(ii) polymeric dispersants;

(iii) transition-metal chelants; and (iv) mixtures thereof.

5. A composition according to claim 4 wherein said pH-reducing nonsoap detersive ingredients comprise at least one ionic detersive surfactant selected from the group consisting of anionic detersive surfactants in at least partially acidic form; semipolar surfactants; zwitterionic surfactants; and mixtures thereof.

6. A composition according to claim 5 further comprising a sugar-derived detersive surfactant.

7. A composition according to claim 6 wherein said bleach activator has a melting-point of about 30° C. or higher.

8. A composition according to claim 7, further comprising an alkaline detergent builder.

9. A composition according to claim 8 wherein said detergent builder comprises a phosphate salt, at a level not in excess of about 35%.

10. A composition according to claim 9 wherein said alkaline hydrogen peroxide source is a sodium perborate and wherein said pH-reducing system of compatible nonsoap detersive ingredients is present at a level of from about 1% to about 12%.

11. A composition according to claim 10, further comprising a soil release polymer.

12. A composition according to claim 11 wherein said soil release polymer is a member selected from the group consisting of nonionic soil release polymers; sulfo-end-capped soil release polymers; and mixtures thereof.

13. A solid-form detergent composition delivering an in-use pH in the range from about 7 to about 9.5, comprising:

from about 0.4% to about 4% of a bleach activator having the formula RC(O)—L which produces a peracid RC(O)—OOH on perhydrolysis;

wherein R is selected from the group consisting of substituted phenyl, furan, substituted furan, 1-napthyl, substituted 1-napthyl and substituted 2-napthyl and L is a leaving group selected from the group consisting of lactams and 4,5 dihydroimidazoles;

said bleach activator having a perhydrolysis selectivity coefficient, $Kp/K_D$ of at least about 5 and a low-pH perhydrolysis-efficiency coefficient of at least about 0.3;

and as formulated, from about 1% to about 12% of an at least partially acidic nonsoap detersive surfactant.

14. A solid-form detergent composition according to claim 13 further comprising from about 0.1 to about 10% of a member selected from the group consisting of sodium phosphate builder salts, sodium polycarboxylate builder salts, and mixture thereof; and about 10% or greater of a member selected from the group consisting of sodium chloride, sodium sulfate and mixtures thereof.

15. A solid-form detergent composition according to claim 13 further comprising a conventional alkanoyloxybenzenesulfonate bleach activator.

16. A solid-form detergent composition according to claim 13 further comprising a conventional tetraacetylethylenediamine bleach activator.

17. A solid-form detergent composition comprising from about 0.1% to about 10% of a bleach activator having the formula RC(O)—L which produces a peracid RC(O)—OOH on perhydrolysis;

wherein R is selected from the group consisting of substituted phenyl, furan, substituted furan, 1-napthyl, substituted 1-napthyl and substituted 2-napthyl and L is a leaving group selected from the group consisting of lactams and 4,5 dihydroimidazoles;

said bleach activator having a perhydrolysis-efficiency coefficient of at least about 0.3; and from about 0.1% to about 5% of a soil release polymer.

18. A bleaching detergent composition according to claim 1 wherein R is a chloro, bromo, or nitro substituted phenyl moiety and L is valerolactam.

* * * * *